Feb. 21, 1967　　　　J. M. CRAWFORD　　　　3,305,080
AUTOMATIC POSITIONING DEVICE
Filed Oct. 8, 1965　　　　　　　　　　　　　2 Sheets-Sheet 1

INVENTOR.
JOHN M. CRAWFORD
BY William J. Miller
ATTORNEY

INVENTOR.
JOHN M. CRAWFORD
BY William J. Miller
ATTORNEY

United States Patent Office

3,305,080
Patented Feb. 21, 1967

3,305,080
AUTOMATIC POSITIONING DEVICE
John M. Crawford, Ponca City, Okla., assignor to Continental Oil Company, Ponca City, Okla., a corporation of Delaware
Filed Oct. 8, 1965, Ser. No. 494,144
23 Claims. (Cl. 206—46)

This invention relates to an automatic positioning device and more particularly to a device for positioning an instrument package in a predetermined position on a desired surface in inaccessible and remote locations.

Prior methods for positioning devices on desired surfaces required manual manipulation at the location. When it was desired to position a device in an inaccessible or remote location it was necessary to send a man to the location. At times it was impractical to send a man because of hazardous conditions or because of an inability to retrieve him after he had manually positioned the device at the location.

One method which has been used to position an instrument in inaccessible locations is to place the instrument in a gas filled sphere and drop the package from an airplane. This method worked satisfactorily for instrument packages which did not require a particular oriented position on the surface of the location; however, when the instrument package required a specific oriented position it was necessary to manipulate the package manually.

The present invention provides a means for positioning an instrument in a predetermined position in a desired location automatically without external assistance of any kind. This invention is valuable in space exploration operations in addition to its value in operations at inaccessible locations on earth.

This automatic positioning device assumes a predetermined position as a result of the displacement of the center of gravity of the device from its center of rotation. The amount of this displacement determines the distance the device will travel before assuming its rightful orientation. The greater the displacement the more rapidly the device will become orientated.

The device of this invention can be inflated prior to dropping from an airplane or spaceship or it can be inflated after reaching the desired surface. When the device is inflated after dropping, it will be positioned close to the point of impact because upon inflation the device merely flops over in such a manner as to have its center of gravity at equilibrium.

There are various instruments presently in use which must be in an upright position to be operable. One such device is an automatic leveling device for use with other instruments. The invention disclosed herein is useful for placing an instrument package, such as an automatic leveling device, in an upright position, or in any other predetermined position.

The primary object of the invention is to provide an automatic positioning device which can be dropped in inaccessible and remote locations and which can position itself automatically in a predetermined position without the need of external manual manipulation.

Another object of the invention is to provide an automatic positioning device which will position itself in the vicinity of impact without the need of manual adjustments.

A further object of the invention is to provide an automatic positioning device which is compact and, therefore, many of the devices can be stored in a small space for transportation to the desired drop zone.

Another important object of the invention is to provide an automatic positioning device which can inflate and deflate itself at a designated time.

A further important object is to provide an automatic positioning device capable of positioning itself at a predetermined distance from the vicinity of impact.

The invention features an automatic positioning device which is constructed of a gas tight hollow flexible walled membrane. Instrument means are enclosed in the membrane so that upon inflation of the membrane the resulting net center of gravity is displaced from the center of rotation of the inflated spherical membrane.

This invention also features an automatic positioning device having a membrane which can be inflated externally through a gas valve or internally by means of a pressurized gas cartridge, such as carbon dioxide, or a gas producing chemical reaction, such as reacting sulfuric acid with sodium bicarbonate to produce carbon dioxide.

The invention also features means for deflating the membrane by mechanical means, over-inflation, or chemical attack on the membrane wall.

Another feature of this invention is a spherical inflated membrane having a truncated surface normal to a radius passing through the center of gravity of the enclosed instrument means. The truncated surface insures that the device will assume an orientated position in the immediate vicinity of the point of impact.

Another important feature of this invention is a method for positioning an instrument package in inaccessible and remote locations by enclosing the instrument package in a gas tight hollow flexible walled membrane so that the center of gravity of the instrument package substantially corresponds to that of the membrane and is displaced from the center of rotation of the membrane when the membrane is inflated, inflating the membrane to form a sphere, dropping the spherically inflated membrane in the desired location, and deflating the membrane.

The above and other objects, features and advantages of the present invention will be more fully understood from the following description considered in connection with the accompanying illustrative drawings wherein.

Figure 1:
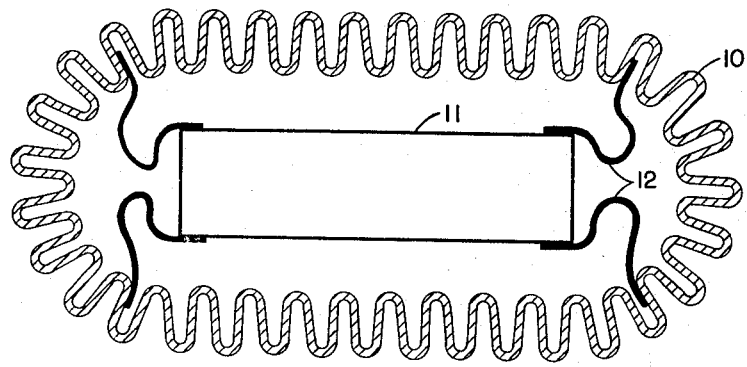
FIGURE 1 is a cross sectional view showing the automatic positioning device prior to inflation.

Referring now to the drawings, and in particular FIGURE 1, an instrument means 11 is enclosed in an inflatable membrane 10 (shown deflated). Instrument means 11 is secured internally to inflatable membrane 10 by means of a plurality of fasteners 12. Fasteners 12 are flexible straps which are secured to the membrane and to the instrument package.

Figure 2:
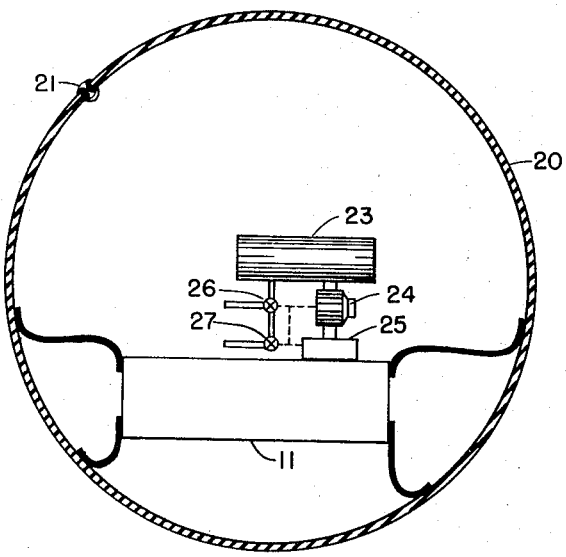
FIGURE 2 is a cross sectional view of the spherical membrane showing the internal apparatus in full view.
Figure 2A:
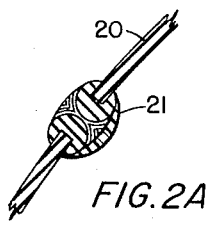
FIGURE 2A is a cross sectional view showing an external gas injection valve.

In FIGURE 2 an instrument means 11 is enclosed in a rubber inflated membrane 20. An external gas injection means 21 is embedded in the rubber membrane 20. A timing means 24, such as a clock type device, and a pressure sensitive means 25, such as a diaphragm operated macro switch, are mechanically connected to a gas valve 26 and a gas valve 27. A high pressure gas storage vessel 23, such as a carbon dioxide cartridge, is connected to gas valves 26 and 27.

Figure 3:
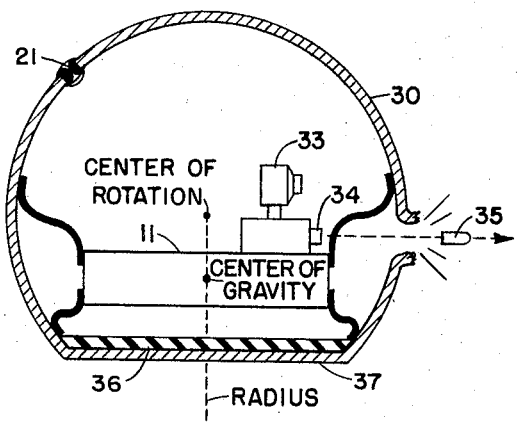
FIGURE 3 is a cross sectional view of another aspect of the invention.

In FIGURE 3 an instrument means 11 is enclosed in a gas tight fabric membrane 30. An external gas injection means 21 is embedded in a gas tight fabric membrane 30. A projectile firing means 34 which is capable of firing a projectile 35 is mechanically connected to a timing means 33, such as a clock type device. A membrane stiffening means 36, such as a planar semi-flexible rubber segment having a diameter corresponding essentially to the inside of the spherical membrane at a point removed from the center of said spherical membrane, is positioned inside the spherical membrane and attached thereto by glue, liquid cement, brads or any other means well known in the art, said membrane stiffening means being arranged at right angles to a radius passing through the center of gravity of the spherical membrane whereby truncated spherical membrane 37 is formed.

Figure 4:
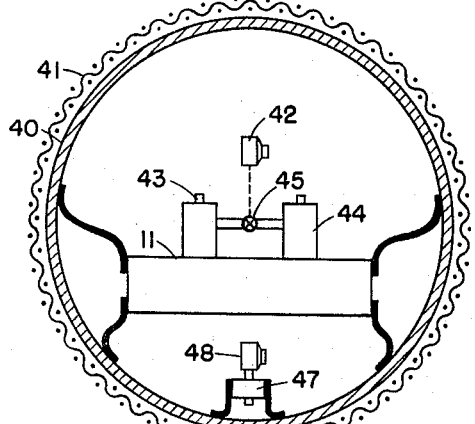
FIGURE 4 is a cross sectional view of another aspect of the automatic positioning device showing the internal means in full view.

In FIGURE 4 an instrument 11 is enclosed in a gas tight fabric membrane 40. Gas tight fabric membrane 40 is enclosed in a wire mesh 41. A chemical storage vessel 43, such as sulfuric acid storage, is connected to a chemical storage and reaction chamber 44, such as sodium bicarbonate storage, by an automatically timed valve 45. Automatically timed valve 45 is controlled by a timing means 42, such as a clock type device. A membrane attacking storage vessel 47, such as sulfuric acid storage, is attached to membrane 40 at a point on a line displaced from the perpendicular to the contactible surface of instrument means 11 so that upon deflation the instrument 11 will make contact with the desired surface. A membrane attacking chemical storage timing means 48, such as a clock type device, is connected to membrane attacking chemical storage 47.

Figure 5:
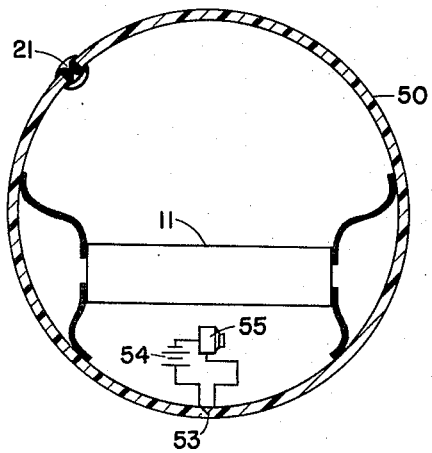
FIGURE 5 is a cross sectional view of another example of the automatic positioning device showing the internal means in full view and illustrating a means for deflating the membrane.

In FIGURE 5 an instrument means 11 is enclosed in a plastic membrane 50. An external gas injection valve 21 is embedded in plastic membrane 50. A hot wire 53 is connected through a timing means 55, such as a clock type device, to a battery 54, said timing means being displaced from the perpendicular to the instrument means 11 so that upon deflation the instrument means 11 will make contact with the desired surface.

In FIGURE 2 the operation of the invention is started by enclosing an instrument means 11 in a rubber membrane 20. Timing means 24 is activated to cause gas valves 26 and 27 to open. When gas pressure reaches a predetermined value pressure sensitive means 25 is activated and closes gas valves 26 and 27. The automatic positioning device is then dropped at the desired location. The device will assume a desired position on the surface of the drop zone as a result of the center of gravity being displaced from the center of rotation of the spherically inflated membrane. After the automatic positioning device has assumed the desired position timing means 24 is activated and causes gas valve 26 to open and gas from high pressure gas storage 23 is released in sufficient quantity to cause membrane 20 to burst. After membrane 20 bursts instrument means 11 makes contactible relationship with the drop zone surface and can then carry out the function of the instrument. Instruments means 11 can have a transmitter or other means of getting the information back to a control station. Means for this are old in the art and are not a part of this invention.

The operation of the invention as shown by FIGURE 2 is possible without pressure sensitive means 25 or gas valve 27. Gas is injected through external gas injection valve 21 in sufficient quantity to inflate rubber membrane 20 to spherical shape. After the device is dropped it can then be over-inflated to cause to burst in the manner previously explained.

The operation of the invention as shown by FIGURE 3 is similar to that of FIGURE 2. External gas injection means 21 is used to inflate gas tight membrane 30. Membrane stiffening means 36 causes truncated membrane 37 to assume its truncated shape by virtue of membrane stiffening means being attached internally to the gas tight membrane and the membrane stiffening means also being less responsive to deformation by the inflating gas which inflates gas tight membrane 30 than is the gas tight membrane. Upon dropping the automatic positioning device truncated spherical membrane 37 causes the device to come to rest on the truncated surface in the immediate vicinity of the drop zone. Timing means 33 activates projectile firing means 34 which in turn causes projectile 35 to be fired through the membrane wall so as to deflate the membrane.

Operation of the invention according to FIGURE 4 is similar to that previously described; however, there are some differences. Gas tight fabric membrane 40 is enclosed in wire mesh 41. This wire mesh gives the membrane a certain amount of rigidity necessary when instrument means 11 is too heavy for the membrane alone. There must be enough rigidity to maintain a spherical shape sufficient to allow the device to roll and assume its upright position. Timing means 42 is activated to open valve 45 to allow chemicals in chemical storage 43 to pass to chemical storage and reaction chamber 44. Upon contact of the chemicals in chamber 44 gas is produced in sufficient quantity to inflate membrane 40 to spherical shape. Membrane attacking chemical storage timing means 48 operates at a predetermined time to release membrane attacking chemicals from membrane attacking chemical storage 47. This chemical attacks membrane 40 and subsequently deflates the membrane.

Operation of the invention according to FIGURE 5 shows hot wire 53 embedded in plastic membrane 50. Timing means 55 operates at a predetermined time to close the circuit from battery 54 to hot wire 53. Hot wire 53 melts a hole in plastic membrane 50 and thereby deflates the membrane.

Operation of the invention according to the above described methods can be further modified to include radio controlled signals which actuate the described timing means. Such radio controlled devices are well known in the art.

It will be obvious to those skilled in the art that many other changes and modifications of the invention may be made without departing from the true scope thereof as defined in the appended claims.

What is claimed is:

1. An automatic positioning device comprising a gas tight hollow flexible walled membrane, means for inflating said membrane to form a sphere, instrument means attached internally to the walls of said membrane such that the center of gravity of said instrument means substantially corresponds to the center of gravity of said spherically inflated membrane and is displaced from the center of rotation of said spherically inflated membrane, and means for automatically deflating said spherically inflated membrane.

2. An automatic positioning device as described in claim 1 wherein said spherical membrane is made of rubber.

3. An automatic positioning device as described in claim 1 wherein said spherical membrane is made of plastic.

4. An automatic positioning device as described in claim 1 wherein said spherical membrane is made of gas tight fabric.

5. An automatic positioning device as described in claim 4 wherein said gas tight fabric is enclosed with steel mesh.

6. An automatic positioning device as described in claim 1 wherein said means for inflating said membrane is a pressurized gas cartridge which can be activated at a predetermined time.

7. An automatic positioning device as described in claim 1 wherein said means for inflating said membrane is a gas producing chemical reaction.

8. An automatic positioning device as described in claim 1 wherein said means for deflating is over-inflating so as to cause said membrane to burst.

9. An automatic positioning device as described in claim 1 wherein said means for deflating is a battery operated hot wire.

10. An automatic positioning device as described in claim 1 wherein said means for deflating is a mechanical puncture caused by a sharp object activated on impact.

11. An automatic positioning device as described in claim 1 wherein said means for deflating is a chemical attack on said membrane material.

12. An automatic positioning device as described in claim 10 wherein said means for deflating is a projectile fired so as to penetrate said membrane wall.

13. In an automatic positioning device comprising a gas tight hollow flexible walled membrane, means for inflating said membrane to form a sphere, instrument means attached internally to the walls of said membrane such that the center of gravity of said instrument means substantially corresponds to the center of gravity of said spherical membrane when inflated, said center of gravity of said instrument means and said spherical membrane being displaced from the center of rotation of said spherically inflated membrane and means for deflating said inflated membrane, the improvement comprising planar stiffening means positioned inside said membrane and attached thereto, said planar means being arranged at right angles to a radius passing through said center of gravity of said inflated membrane whereby said inflated membrane is caused to assume a truncated shape.

14. An automatic positioning device as described in claim 13 wherein said spherical membrane is made of rubber.

15. An automatic positioning device as described in claim 13 wherein said spherical membrane is made of plastic.

16. An automatic positioning device as described in claim 13 wherein said spherical membrane is made of gas tight fabric.

17. An automatic positioning device as described in claim 13 wherein said gas tight fabric is enclosed with steel mesh.

18. An automatic positioning device as described in claim 13 wherein the means for inflating said membrane is a pressurized gas cartridge which can be activated at a predetermined time.

19. An automatic positioning device as described in claim 13 wherein the means for inflating said membrane is a gas producing chemical reaction.

20. An automatic positioning device as described in claim 13 wherein said means for deflating is over-inflating so as to cause said membrane to burst.

21. An automatic positioning device as described in claim 13 wherein said means for deflating is a mechanical puncture caused by a sharp object activated on impact.

22. An automatic positioning device as described in claim 13 wherein said means for deflating is a chemical attack on said membrane material.

23. An automatic positioning device as described in claim 21 wherein said means for deflating is a projectile fired so as to penetrate said mebrane wall.

References Cited by the Examiner
UNITED STATES PATENTS

| | | | |
|---|---|---|---|
| 2,118,165 | 5/1938 | Christopher. | |
| 2,452,783 | 11/1948 | Nebesar. | |
| 2,665,519 | 1/1954 | Burkes | 46—87 |
| 2,681,142 | 6/1954 | Cohen | 206—46 |
| 2,942,379 | 6/1960 | Oman | 46—228 |
| 2,944,771 | 7/1960 | Bush | 244—138 X |
| 3,006,396 | 10/1961 | Cushman | 206 |
| 3,123,117 | 3/1964 | Nourse et al. | 244—138 X |

LOUIS G. MANCENE, *Primary Examiner.*